United States Patent
Jiang et al.

(10) Patent No.: US 10,102,408 B2
(45) Date of Patent: Oct. 16, 2018

(54) QUICK RESPONSE CODE FEATURE DETECTION METHOD AND SYSTEM

(71) Applicant: FUJIAN LANDI COMMERCIAL EQUIPMENT CO., LTD., Fuzhou, Fujian (CN)

(72) Inventors: Shengzhang Jiang, Fujian (CN); Weidong Wu, Fujian (CN)

(73) Assignee: FUJIAN LANDI COMMERCIAL EQUIPMENT CO., LTD., Fuzhou (CN)

(*) Notice: Subject to any disclaimer, the term of this patent is extended or adjusted under 35 U.S.C. 154(b) by 0 days.

(21) Appl. No.: 15/871,912

(22) Filed: Jan. 15, 2018

(65) Prior Publication Data

US 2018/0137323 A1    May 17, 2018

Related U.S. Application Data

(63) Continuation of application No. PCT/CN2016/091006, filed on Jul. 22, 2016.

(30) Foreign Application Priority Data

Jul. 30, 2015 (CN) .......................... 2015 1 0456884

(51) Int. Cl.
*G06K 7/10* (2006.01)
*G06K 7/12* (2006.01)
*G06K 7/14* (2006.01)

(52) U.S. Cl.
CPC ............. *G06K 7/1417* (2013.01); *G06K 7/10* (2013.01); *G06K 7/12* (2013.01)

(58) Field of Classification Search
USPC ................... 235/435, 439, 454, 462
See application file for complete search history.

(56) References Cited

U.S. PATENT DOCUMENTS

2015/0324946 A1* 11/2015 Arce ..................... G06T 1/0021
382/251

FOREIGN PATENT DOCUMENTS

CN             104517090 A         4/2015

* cited by examiner

*Primary Examiner* — Matthew Mikels

(57) ABSTRACT

A method includes: dividing a received QR code image into a multi-row image of rows of pixels whose number is the same as a threshold of the number of rows; calculating an average grayscale value of each column of pixels to form row data, and binarizing the row data; extracting a rectangle image in the binarized row data whose similarity to a preset proportion is smaller than a threshold; binarizing the rectangle image and a region formed by extending the rectangle image by the width threshold upwardly and downwardly respectively; searching for column line segments meeting the preset proportion on a middle column of the rectangle image; translating a diagonal line of a square image in upward and downward directions respectively; searching for and recording black-white demarcation points on the edge of the square image on the translated diagonal line and forming a position detection pattern of the QR code.

8 Claims, 2 Drawing Sheets

QUICK RESPONSE CODE FEATURE DETECTION METHOD AND SYSTEM

CROSS REFERENCE TO RELATED APPLICATIONS

The present application is a Continuation Application of PCT Application No. PCT/CN2016/091006 filed on Jul. 22, 2016, which claims the benefit of Chinese Patent Application No. 201510456884.6 filed on Jul. 30, 2015. All the above are hereby incorporated by reference.

FIELD OF THE INVENTION

The invention relates to the technical field of two-dimensional code identification, and in particular to a quick response (QR) code feature detection method and system.

BACKGROUND OF THE INVENTION

Feature detection of a two-dimensional code is a first critical step in two-dimensional data processing. This is because it is impossible to continue the processing once the detection is failed. However, a two-dimensional code generally has a large amount of data, hence whether the two-dimensional code feature can be quickly detected has a direct influence on the utilization performance of the two-dimensional code. Therefore, a quick and accurate detection of two-dimensional code feature has become an important demand in the two-dimensional code data processing.

A quick response (QR) code is a type of two-dimensional code. The QR code has three position detection patterns which are located at an upper-left corner, an upper-right corner and a lower-left corner of the QR code respectively. Each of the position detection patterns may be considered to be formed by three overlapped concentric squares which are a 7*7 dark color module, a 5*5 light color module and a 3*3 sized dark color module, respectively. Therefore, a proportion of lengths of black and white line segments divided by the center of the position detection pattern meets 1:1:3:1:1.

At present, in most two-dimensional code feature detection methods, scan and detection are performed row by row, and the detection speed is slow.

Chinese invention patent No. CN104517090A, discloses a method and system for detecting a QR code detection pattern. The method includes: detecting a QR code in a first direction, detecting a first line segment of which a proportion of lengths of black: white: black: white: black line segments meets a preset proportion so as to determine a center of the first line segment; detecting, in a second direction, a straight line passing a center point of the first line segment, to obtain a second line segment of which a proportion of lengths of black: white: black: white: black line segments meets a preset proportion, and determining a center point of the second line segment as a center point of the detection pattern. Although only a row-by-row full coverage detection is required in the first direction detection and the detection speed is improved, only the center point of the detection pattern can be found in detecting the detection pattern of a QR code image, and the boundary lines of the detection pattern of the complete QR code can not be determined. Particularly, the boundary lines of the detection pattern of the QR code can not be determined accurately in the case that the QR code is deformed and distorted.

SUMMARY OF THE INVENTION

Technical Problem

The technical problem to be solved by the invention to provide a QR code feature detection method and system, with which the detection speed can be improved and the amount of data operation can be reduced.

Technical Solution

In order to solve the above technical problem, the following technical solutions of the invention are provided.

A QR code feature detection method, which includes:

presetting a threshold of the number of rows, and dividing a received QR code image into a multi-row image of rows of pixels whose number is the same as the threshold of the number of rows;

calculating an average grayscale value of each column of pixels in the multi-row image so as to form row data;

binarizing the row data;

counting the number of consecutive "1" and the number of consecutive "0" in the binarized row data so as to form row proportions;

presetting a row proportion threshold, and extracting a rectangle image corresponding to a row proportion whose similarity to a preset proportion is smaller than the row proportion threshold, from the row proportions;

presetting a width threshold, and binarizing the rectangle image and a region formed by extending the rectangle image by the width threshold upwardly and downwardly respectively;

searching for column line segments meeting the preset proportion on a middle column of the rectangle image;

translating a diagonal line of a square image containing the rectangle image and the column line segments in upward and downward directions respectively;

searching for and recording black-white demarcation points on the edge of the square image on the translated diagonal line; and connecting the black-white demarcation points to form a position detection pattern of the QR code image.

The invention has the following advantageous effects. The multi-row image of the received QR image is detected while row data of the QR code is processed, and the middle column data of the rectangle image is processed while column data of the QR code is processed, thus reducing the amount of data operation and improving the detection efficiency. A column position of the position detection pattern of the QR code in the received QR image is determined by determining whether the similarity between the row data and the preset proportion is smaller than the row proportion threshold. A row position of the position detection pattern of the QR code in the received QR image is determined by determining column line segments on the middle column of the rectangle image that meet the preset proportion. A boundary line of the position detection pattern of the QR code is determined by translating the diagonal line of the square image and searching for the black-white demarcation points on the edge of the square image. Therefore, a region of the position detection pattern of the QR code can be determined quickly and accurately without being affected by image deformation, image distortion and lights.

A QR code feature detection system includes:

a dividing module which is configured for dividing a received QR code image into a a multi-row image of rows of pixels whose number is the same as the threshold of the number of rows;

a calculation module which is configured for calculating an average grayscale value of each column of pixels in the multi-row image so as to form row data;

a first binarization module which is configured for binarizing the row data;

a counting module which is configured for counting the number of consecutive "1" and the number of consecutive "0" in the binarized row data so as to form row proportions;

an extraction module which is configured for extracting a rectangle image corresponding to a row proportion whose similarity to a preset proportion is smaller than the row proportion threshold from the row proportions;

a second binarization module which is configured for binarizing the rectangle image and a region formed by extending the rectangle image by the width threshold upwardly and downwardly respectively;

a first searching module which is configured for searching for column line segments meeting the preset proportion on a middle column of the rectangle image;

a translating module which is configured for translating a diagonal line of a square image containing the rectangle image and the column line segments in upward and downward directions respectively;

a second searching module which is configured for searching for black-white demarcation points on the edge of the square image on the translated diagonal line;

a recording module which is configured for recording the black-white demarcation points on the edge of the square image on the translated diagonal line; and a forming module which is configured for connecting the black-white demarcation points to form a position detection pattern of the QR code.

Advantageous Effects

The invention has the following advantageous effects. A received QR code image is divided into a multi-row image of rows of pixels whose number is the same as the threshold of the number of rows. A position detection pattern of the received QR code image is determined by binarizing the multi-row image, counting row proportions, determining a similarity between the row proportion and a preset proportion, recording a rectangle image whose similarity meets the requirement, further comparing a middle column of the square image with the preset proportion and determining black-white demarcation points on the edge of a square image through a diagonal line. Meanwhile, data of multiple rows of the image is processed simultaneously, and processing of column data involves only one line. In addition, the position of the boundary line of the position detection pattern can be determined. The above process is not affected by image deformation, image distortion and lights. The amount of data operation can be effectively reduced for the system, and the efficiency and accuracy of system detection can be improved.

BRIEF DESCRIPTION OF THE ACCOMPANYING DRAWINGS

DETAILED DESCRIPTION OF THE PREFERRED EMBODIMENTS

Hereinafter, the disclosure, objects and effects of the invention will be described in detail in conjunction with the embodiments and the accompanying drawings.

The critical concept of the invention is to process data of a multi-row image of a received QR code image simultaneously, thereby reducing the amount of data operation and improving detection efficiency.

The embodiments of the invention are descried below.

Figure 1:
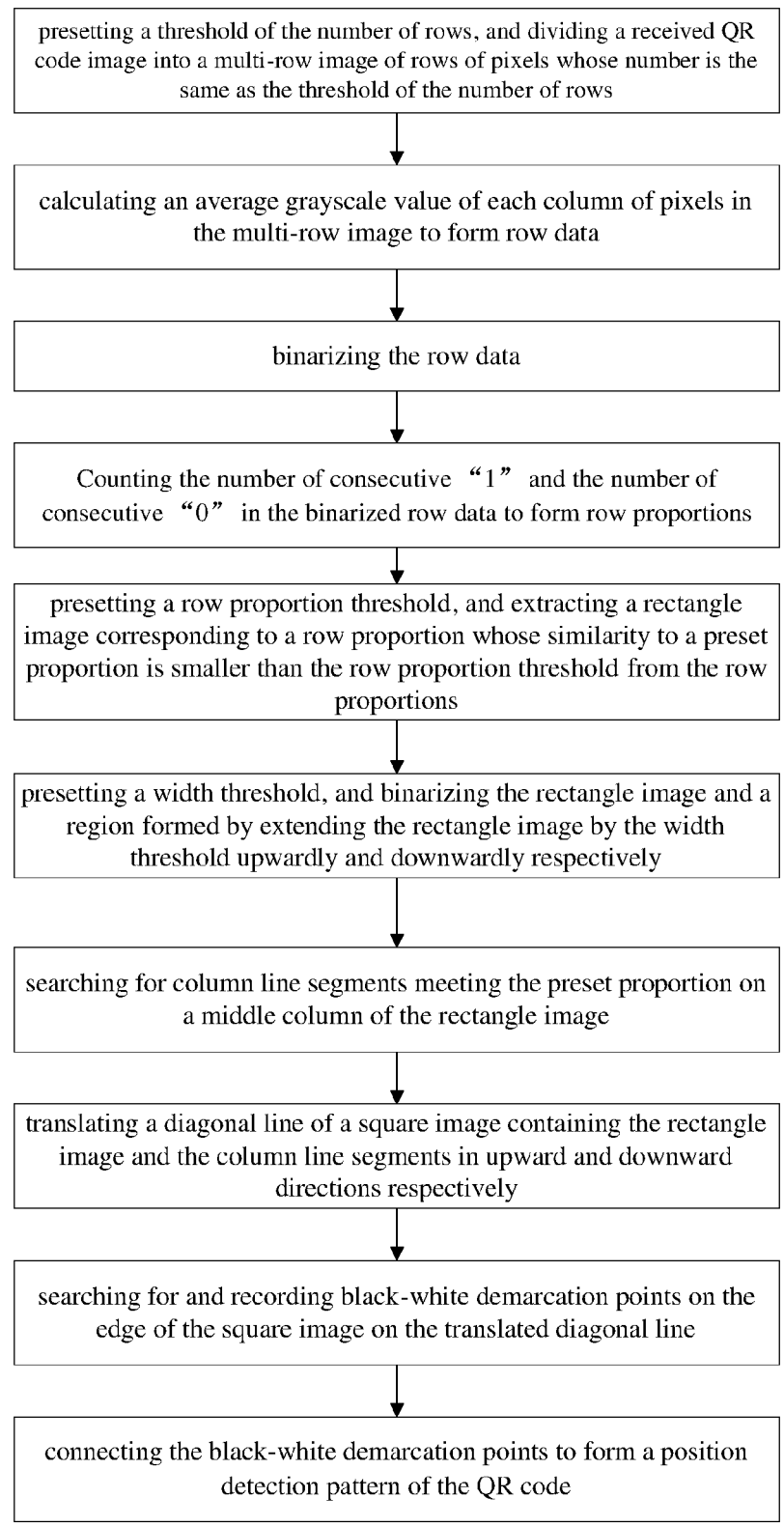
FIG. 1 is a flowchart of a QR code feature detection method according to a first embodiment of the invention.

Reference is made to FIG. 1. A QR code feature detection method includes:

presetting a threshold of the number of rows, and dividing a received QR code image into a multi-row image of rows of pixels whose number is the same as the threshold of the number of rows;

calculating an average grayscale value of each column of pixels in the multi-row image to form row data;

binarizing the row data;

counting the number of consecutive "1" and the number of consecutive "0" in the binarized row data to form row proportions;

presetting a row proportion threshold, and extracting a rectangle image corresponding to a row proportion whose similarity to a preset proportion is smaller than the row proportion threshold from the row proportions;

presetting a width threshold, and binarizing the rectangle image and a region formed by extending the rectangle image by the width threshold upwardly and downwardly respectively;

searching for column line segments meeting the preset proportion on a middle column of the rectangle image;

translating a diagonal line of a square image containing the rectangle image and the column line segments in upward and downward directions respectively;

searching for and recording black-white demarcation points on the edge of the square image on the translated diagonal line; and connecting the black-white demarcation points to form a position detection pattern of the QR code.

Further, the threshold of the number of rows is greater than 1, and less than or equal to the number of rows of pixels corresponding to the position detection pattern of the QR code.

As can be seen from the above description, in the case that the threshold of the number of rows is greater than 1, two or more rows of the image may be processed in one time, thereby improving the detection efficiency. In the case that the threshold of the number of rows is less than or equal to the number of rows of pixels corresponding to the position detection pattern of the QR code, it is effectively ensured that an image of the position detection pattern can be accurately determined in the multi-row image that is processed, thereby improving the detection accuracy.

Further, "binarizing the row data" specifically includes:

calculating a grayscale threshold of the row data based on an Otsu algorithm; and binarizing the row data based on the grayscale threshold.

It can be seen from the above description that, a probability of erroneously distinguishing a foreground color from a background color may be reduced and the accuracy of binarizing the row data may be improved, by calculating the grayscale threshold of the row data using the Otsu algorithm.

Further, "binarizing the rectangle image and a region formed by extending the rectangle image by the width threshold upwardly and downwardly respectively" specifically includes:

binarizing the rectangle image and a region formed by extending the rectangle image by the width threshold upwardly and downwardly respectively, based on the grayscale threshold.

As can be seen from the above description, binarizing data in the above region based on the grayscale threshold facilitates subsequent data processing and is advantageous for maintaining the consistency of the image binarization, thereby improving the accuracy of binarization.

Further, "extracting a rectangle image corresponding to a row proportion whose similarity to a preset proportion is smaller than the row proportion threshold from the row proportions" specifically includes:

extracting a suspected row proportion, which has the same binarized value of initial data as the preset proportion and has the same number of data as the preset proportion, from the row proportions;

presetting a row proportion threshold, and determining whether a similarity between the suspected row proportion and the preset proportion is smaller than the row proportion threshold; and recording a rectangle image corresponding to the suspected row proportion whose similarity to the preset proportion is smaller than the row proportion threshold.

As can be seen from the above description, firstly, the suspected row proportion, which has the same binarized value of initial data as the preset proportion and has the same number of data as the preset proportion, is searched for from the row proportions of the multi-row image. Then, it is determined whether the similarity between the suspected row proportion and the preset row proportion is smaller than the row proportion threshold. Finally, the rectangle image corresponding to the row proportion meeting the above condition is extracted as a portion of the position detection pattern of the QR code. The width of the rectangle image is the width of the position detection pattern of the QR code. The data processing is reasonable and the position of the column at which the position detection pattern is located can be found quickly.

Further, "determining whether a similarity between the suspected row proportion and the preset proportion is smaller than the proportion threshold" specifically includes:

converting the initial data of the suspected row proportion into data that is same as the initial data of the preset proportion, and performing an equal-proportion conversion on all the data of the suspected row proportion to obtain a converted suspected row proportion;

calculating a difference between data other than the first data in the converted suspected row proportion and the data of a corresponding digit in the preset proportion, and obtaining an absolute value of the difference; and if the absolute value corresponding to each digit is less than the row proportion threshold, then the similarity between the suspected row proportion and the preset proportion is less than the row proportion threshold.

As can be seen from the above description, the initial data of the suspected row proportion is converted into data that is the same as the initial data of the preset proportion, an equal-proportion conversion is performed on all the data of the suspected row proportion to obtain a converted suspected row proportion, and then it is determined whether a difference between each digit of the converted suspected row proportion and each digit of the preset proportion is smaller than the proportion threshold, thus determining the similarity. The data processing is reasonable.

Further, a sum of a value that is two times of the width threshold and the preset threshold of the number of rows is greater than a side length of the position detection pattern of the QR code.

As can be seen from the above description, since the sum of a value that is two times of the width threshold and the preset threshold of the number of rows is greater than a side length of the position detection pattern of the QR code, it is ensured that the width of the region is greater than the side length of the position detection pattern of the QR code, and thereby the position detection pattern can be found quickly, accurately and completely.

Further, "searching for column line segments meeting the preset proportion on a middle column of the extracted rectangle image" specifically includes:

searching for middle column line segments;

extending the middle column line segments by the width threshold in upward and downward directions respectively so as to form new middle column line segments; and extracting column line segments meeting the preset proportion on the new middle column line segments.

As can be seen from the above description, the position at which the column of the position detection pattern of the QR code is located is found by searching for column line segments meeting the preset proportion on the middle column of the rectangle image. Therefore, the amount of data processing is small and the detection speed is fast.

Further, "translating a diagonal line of a square image containing the rectangle image and the column line segments in upward and downward directions respectively; and searching for and recording black-white demarcation points on the edge of the square image on the translated diagonal line" specifically includes:

forming a square image containing the rectangle image and the column line segments;

acquiring a diagonal line of the square image;

presetting a translation distance and translating the diagonal line in upward and downward directions respectively;

if the value of the endpoint of the translated diagonal line is a black point, then moving the black point towards the outside of the square image until a white point is met and recording the coordinate of the white point; and if the value of the endpoint of the translated diagonal line is a white point, then moving the white point towards the inside of the square image until a black point is met and recording the coordinate of the black point; and taking the recorded coordinates of the white point and the black point as black-white demarcation points on the edge of the position detection pattern.

As can be seen from the above description, a square image may be formed based on a column position at which the width of the rectangle image is located and a row position at which an endpoint of the column line segment is located. A boundary line of the position detection pattern of the QR code is determined by translating a diagonal line of the square image in upward and downward directions and searching for black-white demarcation points on the edge of the position detection pattern on the translated diagonal line. Therefore, the determination is not affected by image deformation, image distortion and lights, and thereby the data has high accuracy.

A first embodiment of the invention is described in conjunction with FIGS. 1 to 6.

A QR code feature detection method is described below.

Figure 2:
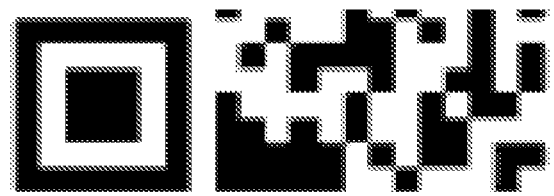
FIG. 2 is a partial image of a QR code containing a position detection pattern according to the first embodiment of the invention.
Figure 3:
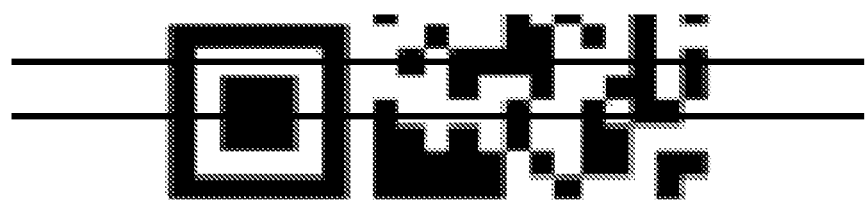
FIG. 3 is a schematic diagram showing the image in FIG. 2 is divided into a multi-row image according to the first embodiment of the invention.
Figure 4:
FIG. 4 is a schematic diagram of one multi-row image divided from FIG. 2 according to the first embodiment of the invention.

Reference is made to FIGS. 1 to 4. A preset threshold of the number of rows is 10. a received QR code image is divided into a multi-row image of rows of pixels whose number is the same as the threshold of the number of rows. In FIG. 2, the received QR code image contains an image of a position detection pattern, wherein there are 28 rows of pixels. FIG. 3 is a schematic diagram showing the position detection pattern in FIG. 2 is divided into 10 rows of pixel data. FIG. 4 is a multi-row image including 10 rows of pixel data, which is obtained by the division.

An average grayscale value is calculated for each column of pixels in the multi-row image so as to form row data, and 251 grayscale values are obtained. The 251 grayscale values specifically include:

f8,f8,f8,f8,f8,f8,f8,f8,f8,f8,f8,ed,ff,ff,ff,ff,ff,ff,ff,ff,ff,ff,ff,ff,ff,ff,ff,ff,ff,ff,ff,ff, ff,ff,ff,ff,ff,ff,ff,ff,ff,ff,ff,ff,ff,ff,ff,ff,ff,ff, ff,ff,ff,ff,ff,ff,ff,ff,ff,d0,40,0,0,0,0,80,ff,ff,ff,ff,f9, 6a,3e,3e,3e,3e,3e,3e,3e,3e,3e,3e,3e,3e,3e,3e,3e,3e,8b,ff,ff,ff,ff,f8,40,0,0,0, 0,56,ff,ff,ff,ff, fe,d6,c6,c6,c6,c6,c1,c2,c3,c3,c3,c3,ec,ff,ff,ff, ff,b7,39,39,39,39,39,39,94,c3,c3,c3,c3,b 5,8e,89,89,89,8e, 56,39,39,39,6c,f9,ff,ff,ff,ff,dd,c6,c6,c6,c6,b2,74,76,76, 76,76,33,0, 0,0,0,31,be,c6,c6,c6,c6,74,39,39,39,39,68,dd,ff, ff,ff,ff,ff,ff,ff,ff,ff,ff,ff,ff,ff,ff,ff,ff,ff, ff,ff,ff,ff,ff,ff,ff,ff,ff,ff, ff,ff,ff,ff,ff,ff,ff,ff,ff,ff,ff,ff,ff,ff,ff,ff,ff,ff,ff,ff,d1,d1, ff,f8,f f,ff,ff,ff,ff,ff,ff,ff,ff,ff,ff,ff,ff,ff,ff,ff,ff.

The row data is binarized. Specifically:

calculating a grayscale threshold of the row data as 0x9a, based on the Otsu algorithm; and binarizing the row data based on the grayscale threshold of 0x9a, and the binarized row data is:
00000000000000000000000000000000000000000000000000000000000000111111000001111111111111111100 000111111000000000000000000001111111000001 111111111100000000000011111111111100000111111000000 0000000000000000000000000000000 0000000000000000000000000000000000000.

The number of consecutive "1" and the number of consecutive "0" in the binarized row data are counted so as to form row proportions. Specifically:

59:6:5:17:5:6:22:7:5:11:11:11:5:6:75, wherein 59 consecutive "0" indicates the number of "0" in a blank region in front of the two-dimensional code in the two-dimensional code image.

A row proportion threshold is preset, and the rectangle image corresponding to the row proportion whose similarity to the preset proportion is smaller than the row proportion threshold is extracted from the row proportions. Specifically:

The row proportion threshold is preset as 0.3 and five groups of suspected row proportions, which have the same binarized value of initial data as the preset proportion and have the same number of data as the preset proportion, are extracted from the row proportions respectively: (1) 6:5:17:5:6, (2) 17:5:6:22:7, (3) 6:22:7:5:11, (4) 7:5:11:11:11, and (5) 11:11:11:5:6.

It is determined whether the similarities between the suspected row proportions and the preset proportion are smaller than the row proportion threshold of 0.3. The above suspected row proportions (2), (3), (4) and (5) can be obviously excluded from the above five groups of suspected row proportions, and the numbers in the suspected row proportion (1) are simultaneously divided by 6 to obtain 1:0.83:2.83:0.83:1.

Differences between the last four numbers in the proportion 1:0.83:2.83:0.83:1 and the numbers at the corresponding digits in a standard row feature proportion 1:1:3:1:1 are calculated, and absolute values of the differences are obtained, that is, 0.17, 0.17, 0.17 and 0. These four numbers are each less than the row proportion threshold of 0.3. Therefore, a similarity between the second suspected row proportion and the standard row feature proportion is smaller than the row proportion threshold.

A rectangle image corresponding to the suspected row proportion whose similarity to the preset proportion is smaller than the row proportion threshold is recorded, and a column at which the rectangle image is located is determined as a column at which the position detection pattern is located.

Figure 5:
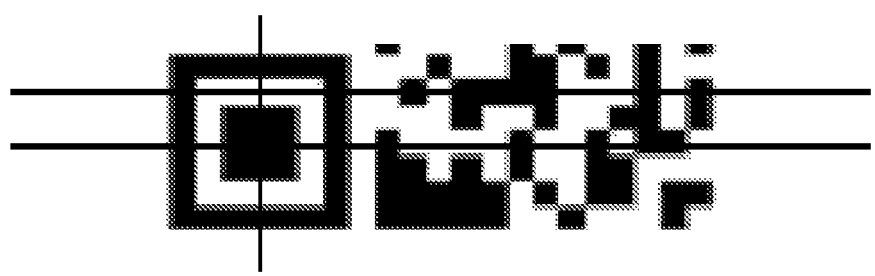
FIG. 5 is a schematic diagram of a middle column of a rectangle image in the multi-row image according to the first embodiment of the invention.

As shown in FIG. 5, a width threshold is preset as n which is a sum of the numbers of various pixels in the above suspected row proportion (1), that is, 6+5+17+5+6=39. Binarization is performed on the rectangle image and a region formed by extending the rectangle image by the width threshold upwardly and downwardly respectively.

Specifically, based on the grayscale threshold of 0x9a, binarization is performed on the rectangle image and a region formed by extending the rectangle image by the width threshold upwardly and downwardly respectively.

Column line segments meeting the preset proportion on the middle column of the rectangle image are searched for, specifically including:

searching for middle column line segments of the rectangle image;

extending the middle column line segments by the width threshold in upward and downward directions respectively to form new middle column line segments; and extracting column line segments meeting the preset proportion from the new middle column line segments, and determining a row at which the column line segment is located as a row at which the position detection pattern is located.

A diagonal line of a square image containing the rectangle image and the column line segments is translated in upward and downward directions respectively.

Figure 6:
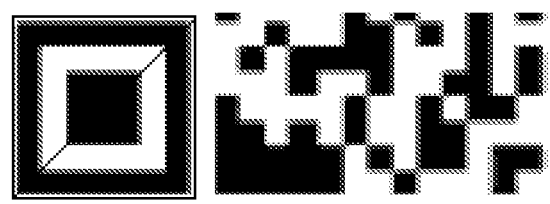
FIG. 6 is a schematic diagram showing a square image and a diagonal line thereof according to the first embodiment of the invention.

Reference is made to FIG. 6. "searching for and recording the black-white demarcation points on the edge of the square image on the translated diagonal line" specifically includes:

forming a square image containing the rectangle image and the column line segments;

acquiring a diagonal line of the square image;

presetting a translation distance and translating the diagonal line in upward and downward directions respectively;

if the value of the endpoint of the translated diagonal line is a black point, then moving the black point towards the outside of the square image until a white point is met and recording the coordinate of the white point; and if the value of the endpoint of the translated diagonal line is a white point, then moving the white point towards the inside of the square image until a black point is met and recording the coordinate of the black point; and taking the recorded coordinates of the white point and the black point as black-white demarcation points on the edge of the position detection pattern of the QR code; and connecting the black-white demarcation points to form the position detection pattern of the QR code.

A QR code feature detection system includes:

a dividing module which is configured for dividing a received QR code image into a multi-row image of rows of pixels whose number is the same as the threshold of the number of rows;

a calculation module which is configured for calculating an average grayscale value of each column of pixels in the multi-row image so as to form row data;

a first binarization module which is configured for binarizing the row data;

a counting module which is configured for counting the number of consecutive "1" and the number of consecutive "0" in the binarized row data so as to form row proportions;

an extraction module which is configured for extracting a rectangle image corresponding to a row proportion whose similarity to a preset proportion is smaller than the row proportion threshold from the row proportions;

a second binarization module which is configured for binarizing the rectangle image and a region formed by extending the rectangle image by the width threshold upwardly and downwardly respectively;

a first searching module which is configured for searching for column line segments meeting the preset proportion on a middle column of the rectangle image;

a translating module which is configured for translating a diagonal line of a square image containing the rectangle image and the column line segments in upward and downward directions respectively;

a second searching module which is configured for searching for black-white demarcation points on the edge of the square image on the translated diagonal line;

a recording module which is configured for recording the black-white demarcation points on the edge of the square image on the translated diagonal line; and a forming module which is configured for connecting the black-white demarcation points to form a position detection pattern of the QR code.

A second embodiment is described as follows.

A QR code feature detection system includes:

a dividing module which is configured for dividing a received QR code image into a multi-row image of rows of pixels whose number is the same as the threshold of the number of rows;

a calculation module which is configured for calculating an average grayscale value of each column of pixels in the multi-row image so as to form row data;

a first binarization module which is configured for binarizing the row data;

a counting module which is configured for counting the number of consecutive "1" and the number of consecutive "0" in the binarized row data so as to form row proportions;

an extraction module which is configured for extracting a rectangle image corresponding to a row proportion whose similarity to a preset proportion is smaller than the row proportion threshold from the row proportions;

a second binarization module which is configured for binarizing the rectangle image and a region formed by extending the rectangle image by the width threshold upwardly and downwardly respectively;

a first searching module which is configured for searching for column line segments meeting the preset proportion on a middle column of the rectangle image;

a translating module which is configured for translating a diagonal line of a square image containing the rectangle image and the column line segments in upward and downward directions respectively;

a second searching module which is configured for searching for black-white demarcation points on the edge of the square image on the translated diagonal line;

a recording module which is configured for recording the black-white demarcation points on the edge of the square image on the translated diagonal line; and a forming module which is configured for connecting the black-white demarcation points to form a position detection pattern of the QR code.

In summary, in the QR code feature detection method and system according to the invention, firstly, detection is performed on a multi-row image of a received QR image to search for a partial rectangle image of a position detection pattern. Then, a position at which the column of the position detection pattern is located is searched for on a middle column of the rectangle image. Then, a boundary line of the position detection pattern is determined. The multi-row image and the rectangle image are binarized with the same grayscale threshold based on the Otsu algorithm. Therefore, the position detection pattern of the received QR code image can be quickly and accurately determined without being affected by image deformation, image distortion and lights, thereby effectively reducing the amount of data operation of the system and improving the efficiency and accuracy of system detection.

What is claimed is:

1. A quick response (QR) code feature detection method, characterized by comprising:

presetting a threshold of the number of rows, and dividing a received QR code image into a multi-row image of rows of pixels whose number is the same as the threshold of the number of rows;

calculating an average grayscale value of each column of pixels in the multi-row image to form row data;

binarizing the row data;

counting the number of consecutive "1" and the number of consecutive "0" in the binarized row data to form row proportions;

presetting a row proportion threshold, and extracting a rectangle image corresponding to a row proportion whose similarity to a preset proportion is smaller than the row proportion threshold from the row proportions;

presetting a width threshold, and binarizing the rectangle image and a region formed by extending the rectangle image by the width threshold upwardly and downwardly respectively;

searching for column line segments meeting the preset proportion on a middle column of the rectangle image;

translating a diagonal line of a square image containing the rectangle image and the column line segments in upward and downward directions respectively;

searching for and recording black-white demarcation points on the edge of the square image on the translated diagonal line; and connecting the black-white demarcation points to form a position detection pattern of the QR code;

wherein the threshold of the number of rows is greater than 1, and less than or equal to the number of rows of pixels corresponding to the position detection pattern of the QR code.

2. The QR code feature detection method according to claim 1, wherein binarizing the row data specifically includes:

calculating a grayscale threshold of the row data based on an Otsu algorithm; and binarizing the row data based on the grayscale threshold.

3. The QR code feature detection method according to claim 2, wherein binarizing the rectangle image and a region formed by extending the rectangle image by the width threshold upwardly and downwardly respectively specifically includes:

binarizing the rectangle image and a region formed by extending the rectangle image by the width threshold upwardly and downwardly respectively, based on the grayscale threshold.

4. The QR code feature detection method according to claim 1, wherein extracting a rectangle image corresponding to a row proportion whose similarity to a preset proportion is smaller than the row proportion threshold from the row proportions specifically includes:

extracting a suspected row proportion, which has the same binarized value of initial data as the preset proportion and has the same number of data as the preset proportion, from the row proportions;

presetting a row proportion threshold, and determining whether a similarity between the suspected row proportion and the preset proportion is smaller than the row proportion threshold; and recording a rectangle image corresponding to the suspected row proportion whose similarity to the preset proportion is smaller than the row proportion threshold.

5. The QR code feature detection method according to claim 4, wherein determining whether a similarity between the suspected row proportion and the preset proportion is smaller than the proportion threshold specifically includes:

converting the initial data of the suspected row proportion into data that is same as the initial data of the preset proportion, and performing an equal-proportion conversion on all the data of the suspected row proportion to obtain a converted suspected row proportion;

calculating a difference between data other than the first data in the converted suspected row proportion and the data of a corresponding digit in the preset proportion, and obtaining an absolute value of the difference; and if the absolute value corresponding to each digit is less than the row proportion threshold, then the similarity between the suspected row proportion and the preset proportion is less than the row proportion threshold.

6. The QR code feature detection method according to claim 1, wherein a sum of a value that is two times of the width threshold and the preset threshold of the number of rows is greater than a side length of the position detection pattern of the QR code.

7. The QR code feature detection method according to claim 1, wherein searching for column line segments meeting the preset proportion on a middle column of the rectangle image specifically includes:

searching for middle-column line segments;

extending the middle column line segments by the width threshold in upward and downward directions respectively so as to form new middle column line segments; and extracting column line segments meeting the preset proportion on the new middle column line segments.

8. The QR code feature detection method according to claim 1, wherein translating a diagonal line of a square image containing the rectangle image and the column line segments in upward and downward directions respectively and searching for and recording black-white demarcation points on the edge of the square image on the translated diagonal line specifically includes:

forming a square image containing the rectangle image and the column line segments;

acquiring a diagonal line of the square image;

presetting a translation distance and translating the diagonal line in upward and downward directions respectively;

if the value of the endpoint of the translated diagonal line is a black point, then moving the black point towards the outside of the square image until a white point is met and recording the coordinate of the white point; and if the value of the endpoint of the translated diagonal line is a white point, then moving the white point towards the inside of the square image until a black point is met and recording the coordinate of the black point; and taking the recorded coordinates of the white point and the black point as black-white demarcation points on the edge of the position detection pattern.

* * * * *